(12) United States Patent
Levell

(10) Patent No.: US 11,551,316 B1
(45) Date of Patent: Jan. 10, 2023

(54) SYSTEM AND METHOD OF RELIEF AND AN ALTERNATIVE TO FORECLOSURE OF REAL ESTATE MORTGAGE

(71) Applicant: Bradley Donald Levell, Oak Park, MI (US)

(72) Inventor: Bradley Donald Levell, Oak Park, MI (US)

( * ) Notice: Subject to any disclaimer, the term of this patent is extended or adjusted under 35 U.S.C. 154(b) by 892 days.

(21) Appl. No.: 14/857,801

(22) Filed: Sep. 17, 2015

Related U.S. Application Data

(60) Provisional application No. 62/051,439, filed on Sep. 17, 2014.

(51) Int. Cl.
G06Q 50/16 (2012.01)
G06Q 40/02 (2012.01)

(52) U.S. Cl.
CPC ........... *G06Q 50/16* (2013.01); *G06Q 40/025* (2013.01)

(58) Field of Classification Search
CPC ............................ G06Q 50/16; G06Q 40/025
USPC .......................................................... 705/38
See application file for complete search history.

(56) References Cited

U.S. PATENT DOCUMENTS

| | | | | |
|---|---|---|---|---|
| 6,192,347 B1 * | 2/2001 | Graff | ...................... | G06Q 30/06 705/31 |
| 8,160,944 B2 * | 4/2012 | Orfano | ................... | G06Q 20/10 705/35 |
| 8,606,699 B2 * | 12/2013 | Boruhovin | ............. | G06Q 40/08 705/35 |
| 2005/0262016 A1 * | 11/2005 | Hill | ........................ | G06Q 30/00 705/39 |
| 2009/0271223 A1 | 10/2009 | Lange | | |
| 2010/0235200 A1 * | 9/2010 | Prieston | ................. | G06Q 20/10 705/4 |

(Continued)

OTHER PUBLICATIONS

Jarvis, P. (2006). Determining geographical casual relationships through the development of spatial cluster detection and feature selection techniques (Order No. 27707103). Available from ProQuest Dissertations and Theses Professional. (2341811487). Retrieved from https://dialog.proquest.com/professional/docview/.*
Cutts, A. C., & Green, R. K. (2005). Innovative servicing technology: Smart enough to keep people in their houses?. Building assets, building credit: Creating wealth in low-income communities, 348377.
Mayer, C. J., & Simons, K. V. (1994). Reverse mortgages and the liquidity of housing wealth. Real Estate Economics, 22(2), 235-255.

(Continued)

*Primary Examiner* — Hani M Kazimi
(74) *Attorney, Agent, or Firm* — Rocklaw PLLC; Michael T. Fluhler

(57) ABSTRACT

A system and method for developing a secondary market for transferring and acquiring mortgages is disclosed. The system offers an alternative to the expensive and wasteful proposition of foreclosures. Using the disclosed system, mortgagees holding a security interest in distressed properties can harness the power of computer technology and intelligent processing of data to rapidly perform actuarial analysis and generate documents that enable interested buyers to acquire mortgages through a mortgage transfer process. The system disclosed creates a secondary market of transferrable mortgages and is designed to be beneficial for new buyers where the equity in the existing mortgage is used for down-payment; or excess equity is used to make a one time payment to the original property owner. The system disclosed offers benefits to all key players—investors, banks, purchasers and realtors, and prevents waste and enables distressed properties to command their market value.

20 Claims, 9 Drawing Sheets

(56) References Cited

U.S. PATENT DOCUMENTS

| | | | |
|---|---|---|---|
| 2010/0274710 A1 | 10/2010 | Misraje | |
| 2012/0246060 A1* | 9/2012 | Conyack, Jr. | G06Q 40/02 705/38 |
| 2012/0254066 A1 | 10/2012 | Glomski et al. | |
| 2013/0179327 A1* | 7/2013 | Young | G06Q 40/025 705/38 |
| 2013/0191271 A1* | 7/2013 | Boruhovin | G06Q 40/02 705/39 |
| 2014/0279404 A1* | 9/2014 | Kallimani | G06Q 40/025 705/38 |
| 2014/0330750 A1* | 11/2014 | Faust | G06Q 40/06 705/36 R |
| 2014/0343970 A1* | 11/2014 | Weber | G06Q 40/08 705/4 |
| 2016/0027051 A1* | 1/2016 | Gross | G06Q 30/0276 705/14.54 |
| 2016/0048934 A1* | 2/2016 | Gross | G06V 10/764 705/313 |

OTHER PUBLICATIONS

Moreno, A. (1995). The Cost-Effectiveness of Community-Based Foreclosure Prevention. Minneapolis, MN, Family Housing Fund.

Pelleg, D., & Moore, A. W. (Jun. 2000). X-means: Extending K-means with Efficient Estimation of the Number of Clusters. In ICML (pp. 727-734).

Kanungo, T., Mount, D. M., Netanyahu, N. S., Piatko, C. D., Silverman, R., & Wu, A. Y. (2002). An efficient k-means clustering algorithm: Analysis and implementation. Pattern Analysis and Machine Intelligence, IEEE Transactions on, 24(7), 881-892.

Jain, A. K. (2010). Data clustering: 50 years beyond K-means. Pattern recognition letters, 31(8), 651-666.

Likas, A., Vlassis, N., & Verbeek, J. J. (2003). The global k-means clustering algorithm. Pattern recognition, 36(2), 451-461.

Muja, M., & Lowe, D. G. (2014). Scalable nearest neighbor algorithms for high dimensional data. Pattern Analysis and Machine Intelligence, IEEE Transactions on, 36(11), 2227-2240.

Kingsley, G. T., Smith, R., & Price, D. (2009). The Impacts of Foreclosures on Families and Communuities. Urban Institute.

* cited by examiner

| Zip Code | Market Value | Equity | Condition | Classification |
|---|---|---|---|---|
| ... | ... | ... | ... | Excellent |
| $Y_1$ | $Y_2$ | $Y_3$ | $Y_4$ | Good |
| ... | ... | ... | ... | Poor |

| $f$ | L1 | L2 | L3 | L4 |
|---|---|---|---|---|
| L1 | 0 | $\Delta_{12}$ | $\Delta_{13}$ | $\Delta_{14}$ |
| L2 |   | 0 | $\Delta_{23}$ | $\Delta_{24}$ |
| L3 |   |   | 0 | $\Delta_{34}$ |
| L4 |   |   |   | 0 |

FIG. 5A

| $f_c$ | MoveIn Ready | Excellent | Good | Fair | Poor |
|---|---|---|---|---|---|
| MoveIn Ready | 0 | 0.1 | 0.3 | 0.6 | 0.9 |
| Excellent |   | 0 | 0.2 | 0.5 | 0.8 |
| Good |   |   | 0 | 0.3 | 0.5 |
| Fair |   |   |   | 0 | 0.2 |
| Poor |   |   |   |   | 0 |

FIG. 5B

| Zip Code | Market Value | Equity | Condition | |
|---|---|---|---|---|
| ... | ... | ... | ... | |
| $X_1$ | $X_2$ | $X_3$ | $X_4$ | 184 |
| ... | ... | ... | ... | |

$$\Theta = \left( \alpha \frac{(O-V)}{V} + \beta \frac{(D-E)}{E} \right) \times \tau \times \kappa$$

FIG. 9

SYSTEM AND METHOD OF RELIEF AND AN ALTERNATIVE TO FORECLOSURE OF REAL ESTATE MORTGAGE

CROSS REFERENCE TO RELATED APPLICATIONS

The application claims the benefits of U.S. Provisional Patent Application Ser. No. 62/051,439 filed on Sep. 17, 2014, by Inventor Bradley D. Levell, which is incorporated herewith by reference.

FIELD OF THE INVENTION

The present invention relates to a method and a computer information management and processing system that implements that method for providing an alternative and relief from foreclosures of real estate mortgages by creating an infrastructure for operating a secondary real estate market for mortgage transfer and acquisition by third parties.

BACKGROUND OF THE INVENTION

Real estate transactions are generally between two parties. The first party, the owner of the real estate or the mortgagor, and the second party the party financing the sale, such as a bank is the mortgagee. The mortgagee holds a collateral security interest in the property. Purchases and sales are arranged through the viewing and contracting for properties often through real estate brokers and agents.

Land is a limited resource for mankind as aptly states in the words of Mark Twain, "Buy land. They've stopped making it." Government-sponsored enterprises such as Fannie Mae (the Federal National Mortgage Association), Freddie Mac (the Federal Home Loan Mortgage Corporation), and the Federal Home Loan Bank System are shareholder-owned corporations having a common goal to keep home ownership easy and a vibrant option for Americans. Having a governmental mandate is to provide funds for low-cost mortgages for middle-income Americans, Fannie Mae and Freddie Mac are the two largest entities of their kind. They are faced with a problem however. Their rapidly increasing debt load represents forty percent of the investment grade bond market.

While the government-sponsored enterprises are geared towards affordable financing of mortgages, similar provisions or programs are sorely missed when a mortgage owners de-faults. The choices for property-owners in such situations are quite limited. Options, such as foreclosures by law or foreclosures by advertisements, are quite expensive for mortgagee banks and take its toll on the property-owner. Furthermore, the property-owner is left fighting lawsuits aimed at making the mortgagee whole to recover the deficient amount from the property-owner after the property has been foreclosed. With their credit ruined, the homeowner is often left without any options for renting and faces the serious possibility of becoming homeless.

Foreclosure implies the lender is using legal rights under the state law to take possession of the property. Generally, foreclosure is an involuntary transaction on the part of the property-owner in that a court orders the owner to give up rights to their property. While foreclosure is a hardship for the homeowner, the lender also accumulates enormous expenses due to the seriousness of contractual failure that foreclosure involves. Lender loses the opportunity cost of principal and income not yet received, in addition to the costs of servicing property, legal costs, costs of property preservation and property disposition. Although foreclosure is a rare event, the costs of foreclosure are enormous. In a 2009 report by the Urban Institute, Kingsley et. al. estimated the total cost for a full formal foreclosure process including the cost to the property owner, to local government, to the lender lost interest during delinquency, foreclosure costs, and disposition of the foreclosed property was $79,443 with the process taking an average of 18 months to resolve. See Kingsley, G. T., Smith, R., & Price, D. (2009). The Impacts of Foreclosures on Families and Communities. Urban Institute. Incorporated herein by reference.

What is needed is an alternate system for managing the financial obligations of a commercial or residential property owner facing dismal prospects for continuing their property ownership due to dire employment or family event or other circumstances that is making their continued property ownership difficult or impossible. A system that literally does not put the defaulting homeowner, for example, "out on the street" is desired. What is needed is a system that puts the property in the hands of someone who will care for and add value to the property and provide the ability to the property-owner to continue make economic contributions to the national gross domestic product. A system that stems the excessive losses associated bleed through a foreclosure leaves everyone a loser. See Moreno, A. (1995). The Cost-Effectiveness of Community-Based Foreclosure Prevention. *Minneapolis, Minn., Family Housing Fund.* Incorporated herein by reference.

Voluntary title transfer where the property is transferred with no consideration is one such alternative to foreclosure that but still had average costs in excess of $44,000 and took nearly one year to conclude. Furthermore, state laws can affect cost of voluntary title transfers where the states that allow non-judicial foreclosure or power-of-sale foreclosure, the title to property can be obtained within 2 to 4 months. However, in those states requiring judicial foreclosure, voluntary title transfers can take 6 months to a year. The lender, after securing title, still needs additional time to dispose the property. The property-owner still remains liable in most states where lender can recover monies owed on the mortgage from other assets the borrower has.

There are other options under which the borrower can voluntarily transfer title when property retention does not appear possible. For example, a deed-in-lieu of foreclosure involves the borrower essentially handing over the keys thereby foregoing any continued ownership interest in the property in exchange of the cancellation of the mortgage obligation. A short sale or short payoff or pre-foreclosure sale is a negotiated and lender approved sale where a buyer exists but the sale proceeds are less than the amount owed and closing costs. Therefore, a short sale is an agreed upon sale of a property for less than the amount of the mortgage balance, executed as a means for both a borrower and a mortgage lender to essentially cut their losses. The lender in a short sale either negotiates an unsecured repayment plan or forgives the remaining debt. There are many drawbacks of short sales, which can be very time consuming, and in essence the relief is simply giving the property back to mortgagee. What is needed is to make the property available on a secondary mortgage by reducing the principal and make it attractive for transfer or acquisition by a third party buyer or transferor. This system offers the advantage of making the property turn around quickly and enabling the mortgagee bank to recoup some costs from the proceeds of closing a mortgage transfer.

A workout mortgage assumption or subrogation permits a qualified applicant to assume title to the property and take on the mortgage obligation from a delinquent borrower or a borrower in imminent danger of default. While some mortgage contracts have workout mortgage assumption terms already in place, a workout assumption is possible in most cases notwithstanding.

Another alternative to avoid foreclosure is reverse mortgages. A reverse mortgage is different from a traditional mortgage in that homeowner is not required to make any payments to a lender. Instead, loan proceeds are paid out to the property owner according to a plan, which consists of a monthly payment, a line of credit, a lump sum, or a combination of these options. Thus, the property owner can tap into the equity of the property without selling the house. Based on the equity in a home, a lender generally can make monthly payment to the property-owner that the property-owner can in turn use towards making their monthly payments to the primary mortgagee. This reverse mortgage loan must be repaid if the house is sold.

One problem with reverse mortgage—also called a home equity conversion mortgage—that the homeowner must be over 62 years of age in addition to having substantial equity in the home. The reverse mortgages are heavily regulated by the Federal Trade Commission and can provide a safe approach to preventing foreclosure and preserving equity in your home. Another problem is that reverse mortgage is harder to obtain in a time of rapidly decreasing property values due to the uncertainty surrounding the amount of equity in a property. Yet another issue with reverse mortgage is that while the payments to the primary mortgagee may be covered, homeowners are responsible for paying the property taxes and insurance. See Mayer, C. J., & Simons, K. V. (1994). Reverse mortgages and the liquidity of housing wealth. *Real Estate Economics, 22*(2), 235-255. Incorporated herein by reference.

An assumption of is utilized rarely because of impediments such as the due on sale clause included in most mortgage contracts. The due on sale clause states that if the property is transferred to a new owner, then the full loan balance will be accelerated and the entire balance of the loan be repaid. Moreover, the equity that a property-owner has in their property before it becomes distressed must be given up by the property-owner. This is one of the reasons that the mortgage assumption is not a preferred strategy for avoiding foreclosure except in a situation where the defaulting property-owner has little equity that they are willing to give up to preserve their credit from being adversely affected by the foreclosure. What is needed is a system where the assumption is executed like a transfer or assumption of the mortgage and provisions of transfer or acquisition contract between the new owner (transferor) and the mortgagee bank are such that the original mortgagor's equity in the property does not zero out upon the execution of a mortgage transfer.

The current mortgage typically includes a due on sale clause making a traditional assumption of mortgage an impractical alternative. While there are some limited exceptions to the due on sale clause, the system disclosed here makes the bank in-charge with making a determination at the outset whether the property is suitable for mortgage transfer. And since the bank itself is the enforcer of the due-on-sale clauses, such a clause becomes moot if the bank participates in a secondary market of mortgage transfer after conducting an actuarial analysis to determine if the transfer and acquisition is a suitable alternative for a property. The situation is quite different from the bank being kept from the enforcing the due-on-sale clause by federal law in certain transactions such as a transfer from a parent to child, a transfer to a relative upon the borrower's death, a transfer between spouses, and transfers resulting from a divorce or legal separation. In this case, it is the prerogative of the mortgagee bank to forego the enforcement of the due on sale provision if it makes economic sense. Generally, the lender will be inclined to agree to mortgage transfer if the current market value of the property is less than the outstanding indebtedness and the purchaser is willing to make up the difference in cash, or when the economic climate is such that the expected economic benefit from foreclosure would be dismal.

Conventional mortgage loans often require the buyer to come up with a down payment of as much as 20% of the purchase price of the home. First time homebuyers, even with good credit, stable jobs, often do not have the ability to come up with a down payment needed towards the purchase of a home. What is needed is a system that enables perspective homeowners to become homeowners without having them come up with a large down-payment. The mortgage transfer and acquisition method disclosed achieves this objective and makes home ownership possible for a individuals who can otherwise qualify but do not have a cash reserve towards making a down payment.

SUMMARY OF THE INVENTION

A system for creating a secondary real estate market is disclosed in this application. Generally, after a property-owner misses a certain number of payments, typically two payments, the bank notifies the property owner that their property has become subject to foreclosure. Following this notification is a series of statutory steps that the bank must take to make to preserve their rights. Furthermore, there is a mandatory redemption period during which the property-owner has the right to make good on their debt and redeem their property.

Mortgages are often serviced by a mortgage servicing company to which the property owners make their mortgage loan payments and which performs other services in connection with mortgages. The mortgage servicing company could be an entity that originated the mortgage, or it may have purchased the mortgage servicing rights from the original mortgage lender. Over the past few years mortgage servicing companies have been blamed for misdeeds, including robo-signatures, improper foreclosure procedures, and deceptive practices in the loan modification process. In response, the US Congress has enacted legislation such as the Dodd-Frank Wall Street Reform and Consumer Protection Act whereby the property owner is given a period of 120 days before the foreclosure process is initiated by the mortgage service provider.

Considering the dire consequences and costs associated with foreclosure, the business process disclosed in this application is an intervention step taken by the bank before the property goes into foreclosure. Under the business process disclosed herein, upon the property-owner's failure to make a certain number of payments, the mortgagee notifies the property-owner of an alternative to foreclosure. In an embodiment of the invention, the alternative to foreclosure is the transfer of mortgage to an investor, property-owner, realtor, or another bank deemed qualified by the original mortgagee.

The bank notifies the property-owner seeking their notarized consent to allow the bank to exercise the option to have the property-owner's mortgage assumed. In an embodiment of the invention, the property-owner is also informed of their option of executing a contract in favor of the bank in lieu of foreclosure. By utilizing this option, the bank acts as a mediator in helping the property-owner find a viable buyer who will then be the transferee of the mortgage under a set of agreed upon terms of transfer. The original property owner coveys the deed to the new transferee and walks away with their credit unscathed and possibly with some cash in their pocket. This business method offers the advantage to the bank by saving the costs associated with maintaining the property while the property is in foreclosure, as well as the actual legal and administrative costs associated with the fore-closure process itself. Furthermore, the process of a mortgage assignment has no negative impact on the original property-owner's credit worthiness. Whereupon, at the conclusion of the mortgage transfer, the original property-owner has the ability to seek alternative living arrangements, such as the option of renting a property they can afford. This circulates money into the economy and has an overall positive impact on the national gross domestic product (GDP).

If the mortgage contract states that it is assumable, then you can transfer the mortgage to a new owner. If the mortgage is silent, it is considered assumable. Mortgagee banks require that the new buyer qualify before assuming the mortgage. The burden of having a buyer assume mortgage has always been on the distressed property owner who generally is neither in a bargaining position nor has the infrastructure to have a buyer assume their mortgage into a viable option. The distressed property owner always sidestepped this option because of the "due-on-sale" clause. What is needed is a method where the process of mortgage transfer is not burdensome for the distressed property owner. What is needed is a method for transfer that is offered by the lending institution. In the improved method for mortgage transfer disclosed herein, the process is facilitated by having the lending institution and the mortgage servicing company become an active participant in the process of transfer and acquisition by the new owner.

In a typical conventional mortgage the buyer has to put down 20% of the sale price as a down payment. This is a problem for many prospective buyers who albeit have good credit rating and an ability to pay for and keep their mortgages current with timely payments. Banks are justified in requiring down payment are looking to minimize their risk of default by the property-owner. Often, there is some equity in the property that the mortgagee bank is offering for transfer in lieu of foreclosure. In the novel method for mortgage transfer disclosed in this application, the new buyer can contract to take over the equity as a basis for continuing the payments on the assumed mortgage. Therefore, in consideration for handing over their equity to the new buyer and having their mortgage payment assumed, the distressed property owner avoids the dire consequences on their credit report.

While it is attractive for a distressed property owner to protect their credit rating and score, the amount of equity in a property may be significant for them to pass up. Upon the conclusion of the auction in a foreclosure, the distressed property owner gets the proceeds remaining after expenses and loans are paid off. This amount could be significant when the property value and equity are high and the fore-closure scenario has sprung up due to some unforeseeable events. What is needed is a mortgage transfer method that is fair to the distressed property-owner and entitles them to a fair share of their equity in their property. The novel mortgage transfer method disclosed herein provides a mechanism for the distressed property-owner to receive an equity payments from the bank as a portion of the mortgage payments received from the new buyer assuming the mortgage. This enables the original property-owner to put the equity payments received towards the purchase of a new property thereby putting that equity back into the economy.

BRIEF DESCRIPTION OF THE DRAWINGS

The invention will be described in conjunction with the attached drawings in which referenced numerals designate elements, and wherein, The invention will be described in conjunction with the attached drawings in which like referenced numerals designate like elements, and wherein.

FIG. 5A and FIG. 5B respectively illustrate the formulation and an example for handling linguistic variables in computation of distance between the cluster means and property vectors;

FIG. 9 represents the formulation of a Mortgage Transfer Support parameter that measure the level of support a mortgagee bank allocates to a specific bid by a purchaser transferee.

DETAILED DESCRIPTION OF THE INVENTION

Figure 1:
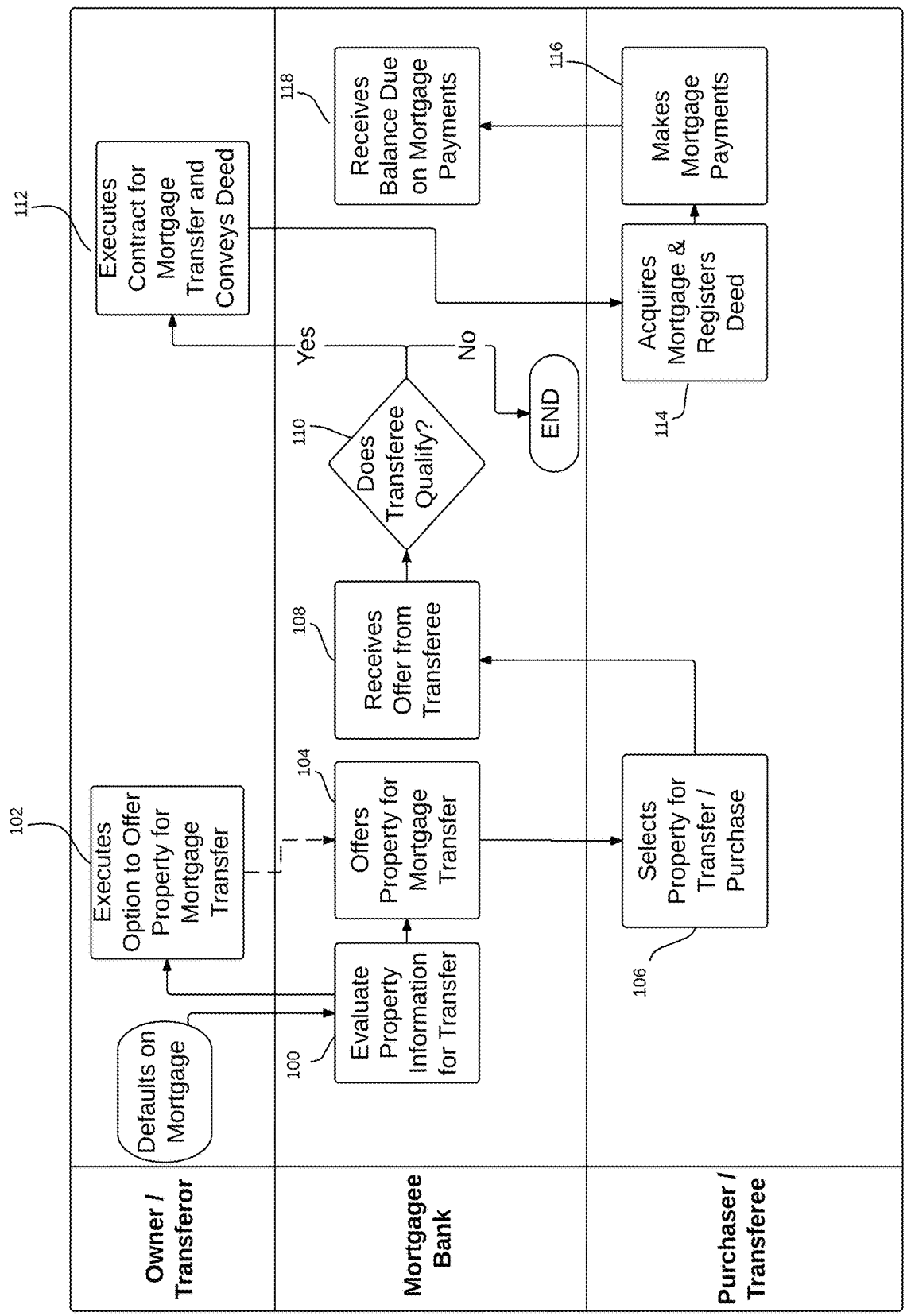
FIG. 1 is an overview of the activities and interactions between the Owner/Transferor, Mortgagee Bank and the Purchaser/Transferee.

Foreclosure of a real property due to mortgagor's default has substantial costs to the society and has a grave negative impact on the economy. Moreover, typically a property stays in foreclosure anywhere from 12 to 18 months. A property's going into foreclosure also negatively impacts the valuation of neighboring properties—an intangible loss that the neighboring property-owners suffer due to no fault of their own.

Using the method and system disclosed herein, these losses and waste are completely avoided. Instead of losses, the method and system disclosed herein result in having a salubrious affect and the benefits of adding to the economy and a collectively a significant positive impact on the national GDP.

Definitions: As referred to in this application, the term property denotes all types of real estate properties including but not limited to residential, commercial, or investment properties. The original mortgagor is the transferor of the property. The purchaser is a new owner referred to as the transferee of the mortgage. The transferee acquires the new mortgage using the system and the method described in this application. The lender bank holding the lien on the property is the mortgagee bank.

The process begins by the mortgagee presenting a transfer of mortgage option to property-owner in default. The property-owner (mortgagor) may decide to exercise this option by presenting a notarized and legally binding document promising that they will deed their property to the entity assuming their mortgage obligations provided that such transfer of mortgage will meet the approval of the lender bank (current mortgagee).

Upon the property-owner's election of the legally enforceable option to try and have their option assumed, the mortgagee forwards the property information to real-estate franchises. In an embodiment of the business method, the mortgagee forward the property information to a service provider that in turn makes it available to its subscribing investors.

An investor or real-estate franchisee, both directly or through a service provider, may look at the property and decide to assume the mortgage by electing to make up for the missed payments and other expenses needed to bring the mortgage up to date. In an embodiment of the invention, the investor or the franchisee may make an offer of sum certain as consideration for the assuming the mortgage and deed.

In the real estate market in the United States, Freddie Mac and Fannie Mae provide the guidelines for underwriting mortgage loans. After a pre-qualification step, a borrower may take on the mortgage transfer and these transferrable or assumable mortgages go from the bank to the mortgage pool for transfer and can be made open to realtors to offer to clients in a secondary real estate market. In an embodiment of the invention, the transaction is confined between the bank and realtors to ultimately market to the public. In this manner, the realtors will negotiate their own commission structure with the client. At this time just allowing realtors to have access to this site for marketing aspects allows these properties to be sold more quickly and generate money for the realtors and also mortgage providers without having the need to have the pre-qualification for assumed mortgages.

If the bank receives a economically viable offer for mortgage assumption from an investor or real-estate franchisee, the bank may choose to follow the route of letting a third party assume the mortgage instead of the traditional option to foreclose and make good on their debt. In this manner, the business method disclosed in this application provides another option to mortgagee and avoids the lesser economically viable options such as foreclosure, short sales, and deed-in-lieu.

If the offer to take over the mortgage by an investor or a real-estate franchise is approved by the mortgagee, this puts the property back in the real-estate market. In an embodiment of the invention, if an investor or a real-estate franchise assumes the property, it cannot be put up for transfer again and must be sold through the entity assuming the mortgage. This prevents the mortgages from getting traded on a derivative basis. The entity assuming the mortgage is instead making payments and responsible for the upkeep just the same way as the original property-owner. The net effect of this limitation on trading mortgages is that capital flow positively into the economy and benefits the GDP.

An embodiment of invention shown in FIG. 1 illustrates the interactions between the Property Owner, Mortgagee Bank, and the Purchaser receiving the transfer or the acquisition of mortgage. After defaulting on their mortgage payments, the mortgagee bank evaluates property 100 for putting it up for transfer. If the mortgagee bank deems a transfer option appropriate, the owner or transferor executes an option 102 to offer the property for transfer. Upon receiving the owner's option, the mortgagee bank releases the property and offers it to service providers to transfer property which is selected by a purchaser 104. Upon receiving the offer 108, the mortgagee bank performs a credit check and other evaluation 110 of the purchaser or transferee to determine if they qualify to acquire the mortgage. If the mortgagee bank approves of the transfer, the mortgages bank exercises its option and executes a mortgage transfer or acquisition 112 contract in favor of the new purchaser transferee with the owner transferor conveying the deed in their favor. The purchaser transferee registers the deed 114 in their name and continues to make payments 116 to the recipient mortgagee bank 118.

The mortgage transfer process from the perspective of the mortgagee bank requires the approval of both the property as being suitable for a transfer, as well as the credit worthiness of the transferee similar to approving a borrower for mortgage. There are secondary reasons that a mortgagee bank often takes into consideration. The prospect of a foreclosure—due to the associated costs and delay in resolution—is often a choice of the last resort for a mortgagee bank. Consequently, the mortgagee bank will assume some risk and get the benefit of obtaining a quick resolution to the delinquent mortgage. Potential purchaser transferee will often recognize this and could force the bank to accept an offer that is lower than what the market would bear. The success of this business method therefore depends on the ability of the mortgagee bank to receive a fair offer in a secondary market where the market forces will dictate that the bank receives the best offer from a transferee.

Figure 2:
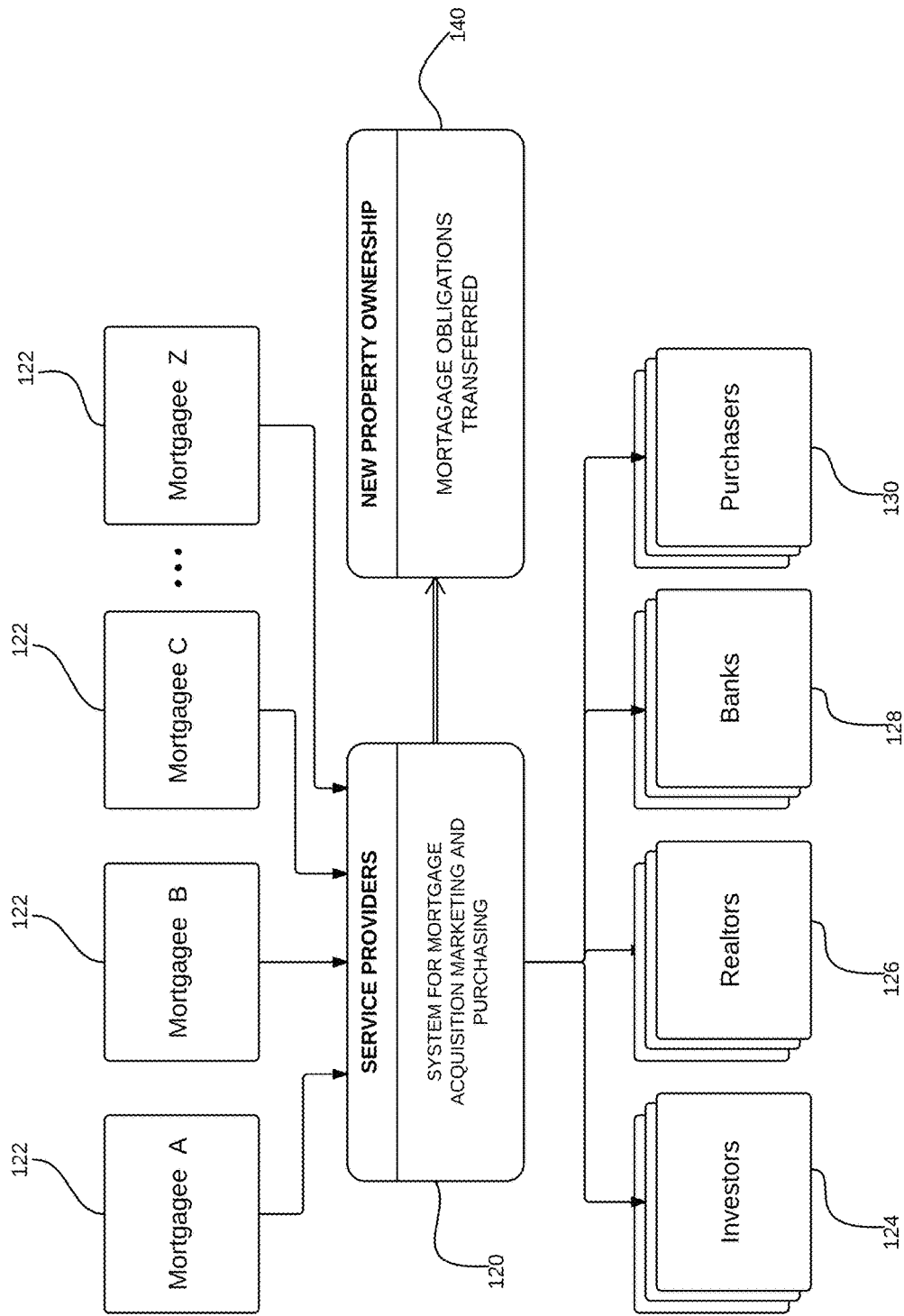
FIG. 2 illustrates the interactions between the various stakeholders in the disclosed system for mortgage transfer and foreclosure relief.

An embodiment of the invention shown in FIG. 2 illustrates the characteristics of a secondary market where the interactions between the various stakeholders. The secondary market uses an information technology infrastructure to enable the mortgagee bank find a purchaser transferee that will offer a fair price to the mortgagee bank. During the process of a foreclosure, the mortgagee bank will seek to minimize the loss on its loan by holding a foreclosure auction. In an embodiment of the system, mortgagee bank to similarly seek out potential investors or purchasers in a manner that the bank receives mortgage transfer offers that are in line with the true market value of the property.

As illustrated in the embodiment of the invention in FIG. 2, the mortgagee banks 122 works with the computing systems of the service providers 120 that enables the bank to market the selected properties to a variety of transferees including investors 124, realtors 126, other banks 128 building their investment portfolios, or individual purchasers 130. What makes it more attractive is that mortgagee bank gets to exercise this option without having to expend property maintenance and legal costs. Furthermore, the bids on the property are made at a time when the property is generally in a better state of maintenance before sinking into a typical dilapidated state of a foreclosed home.

The illustration in FIG. 2 demonstrates the how the key players in the real-estate business can in fact create a secondary market for distressed properties. Various mortgagee banks list with service providers the properties they are interested in putting up for transfer. The service providers in turn make these properties available to a wide array of subscribers who can view information on these properties.

The potential transferees can include investors, realtors, banks and other individual purchasers. By the way of an example, banks could be looking into some of these properties in a growing market as potential tangible investments for the private banking customers. The service providers enable these various subscribers to bid on properties. When a bid is acceptable to listing bank, the deal closes and the bidder assumes the obligations of the original mortgagor who in turn conveys a deed to the property to the bidder who assumes the mortgage obligations 140.

A mortgagee bank can utilize the economics equations of a specific mortgage to establish a prioritization for transfer. Let the amount that the property-owner currently owes on a mortgage is designated as O, and the equity that the property-owner has in the property be denoted as E. Thus, the property-owner purchased the property for a purchase price of P where P=O+E. Let us further assume that current market value of the real estate is V. A real estate is considered to be underwater (UW) or distressed when:

$$UW \equiv V < O \qquad (1)$$

In an embodiment of the invention, a mortgagee bank uses the parameter (A), in addition to the other considerations discussed below, to prioritize offerings for transfer or acquisition. For the mortgages that are distressed, the parameter (A) is defined as follows:

$$\Delta = (O - V) \qquad (2)$$

A bank may assess the extent to which a property is underwater against the equity that the property-owner has in the property to prioritize properties for transfer. If the property-owner that has higher level of equity should be rated higher since the property was lived in, and was cared for, by the property-owner for a longer period of time.

In an embodiment of the invention, the bank uses an Equity Loan Risk Ratio (ELRR) to compute their interest in promoting the transfer of a mortgage for properties that are currently underwater as defined in Eq. (1). Properties with higher value for ELRR are better candidates for mortgage transfer in order for the mortgagee bank to reduce the risk of going into foreclosure.

$$ELRR = \frac{E}{\Delta} \qquad (3)$$

In an embodiment of the invention, the bank undertakes a principal reduction to the extent of Δ and asks that a loan origination fee in the amount of A or some fraction thereof be paid to the bank by the borrower seeking to assume the mortgage. In an embodiment of the invention the mortgagee bank maintains and provides statistics summarizing the average values of A grouped by market value of the property or grouped by the zip code of where the property is located. These benchmarks are made available to the potential purchaser transferees looking to acquire the mortgage under the mortgage transfer program. In this way banks provides them with additional information enabling them to make an informed decision about acquiring a mortgage.

Figure 3:
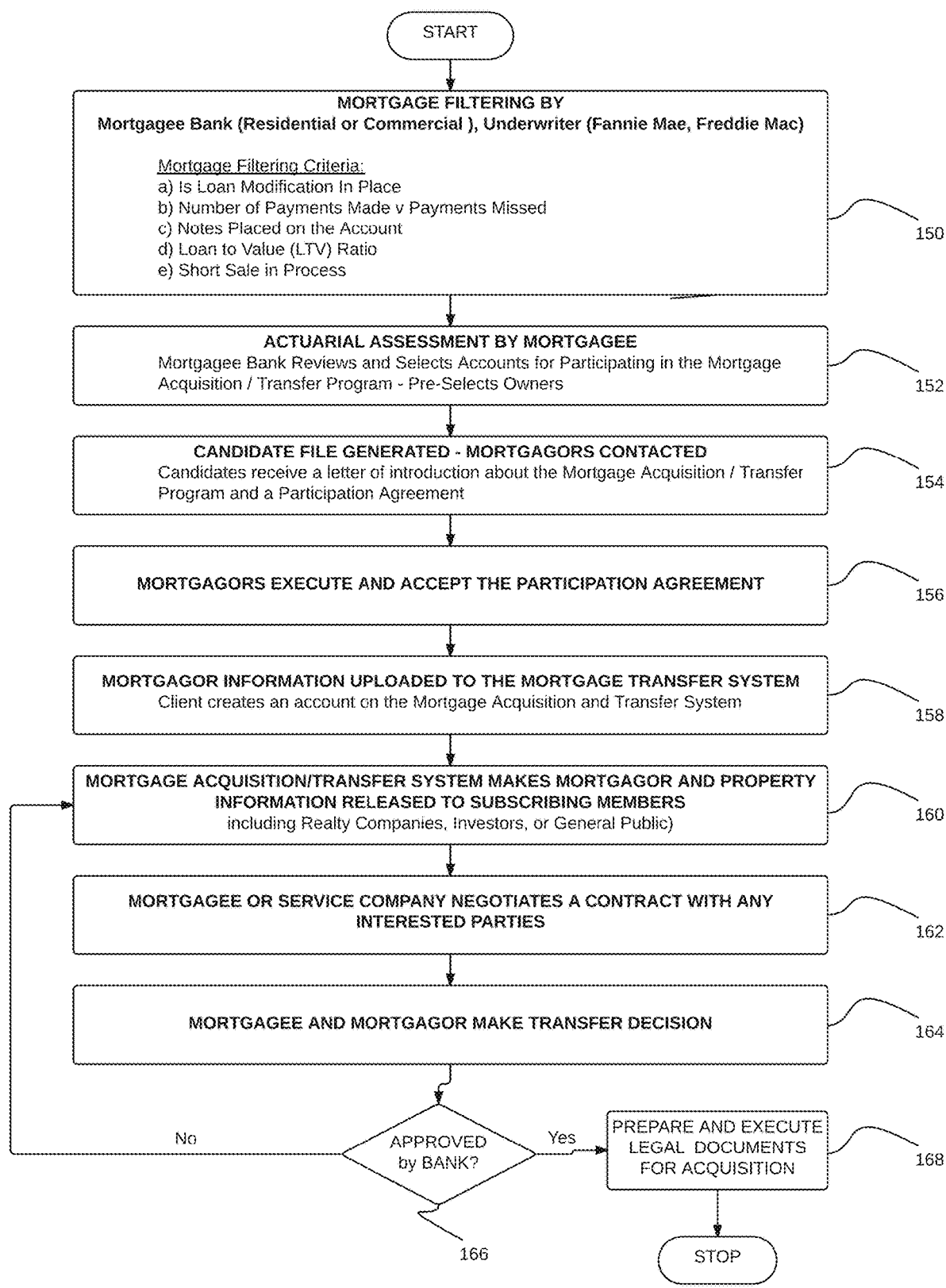
FIG. 3 illustrates the processing steps in a method for mortgage transfer and foreclosure relief.

FIG. 3 depicts the steps in the process of a mortgagee bank transferring mortgages. The bank begins with a filtering or pre-selection processing step 150 wherein a number of factors, including but not limited to those listed in Step 150, are used to establish if a distressed property should be allowed by the mortgagee bank to be transferred. The bank performs an actuarial assessment 152 of the property and pre-selects the property to put it up for transfer through a secondary market service provider.

The use of actuarial services helps the mortgagee bank assess the level of and plan for the financial impact and the risk in allowing the transfer of a mortgage rather than their default course of action of proceeding with foreclosure for defaulting property owners. Actuarial assessment uses mathematical and statistical models to evaluate risk as well as call upon other fields including probability, finance, economics and computer programming to create actuarial models. As discussed in below, an in-depth actuarial analysis of a small number of properties is used to categorize or cluster them into groups indicative of the risks associated with allowing a mortgage transfer. The in-depth analysis of a small number of model properties looks at risk aversion factors such as location, market value, equity, forecast market condition, and estimated loss or gain of foreclosure, condition of the property, age and expected remaining life of the property, its attractiveness to families, and so on. By using mathematical and statistical modeling, actuaries are able to provide estimates of a successful transfer of the property and help the mortgagee bank plan for future probabilities and possibilities of a successful transfer of the mortgage to a new purchaser.

Further continuing the steps of mortgage transfer in FIG. 3. Upon completing an actuarial analysis of the distressed property and determining that the property is a good candidate for transfer, the mortgagee bank contacts the current mortgagor to introduce the mortgage transfer program 154. The mortgagor then executes a participating agreement 156 that legally allows the mortgagee bank to put the property up for transfer through the infrastructure provided by their secondary market service providers 158. This property information thus become available to the subscribers—investors 124, realtors 126, other banks 128, and general public purchasers 130—who can search and view details of the property 160. In an embodiment of the invention, the service company receives bids for the property from the subscribers and executes a purchasing agreement 162 on behalf of the mortgagee bank. In an embodiment of the invention, the mortgagor or transferor and the mortgagee bank then make a decision to allow the transfer or acquisition of the property by a transferee 164 to proceed. Upon the approval of the mortgagee bank the original loan in transferred to the new entity 166 who then becomes the new owner through the execution of legal documents 168 making them liable for continuing payments on the mortgage and property taxes.

Figures 4A, 4B:
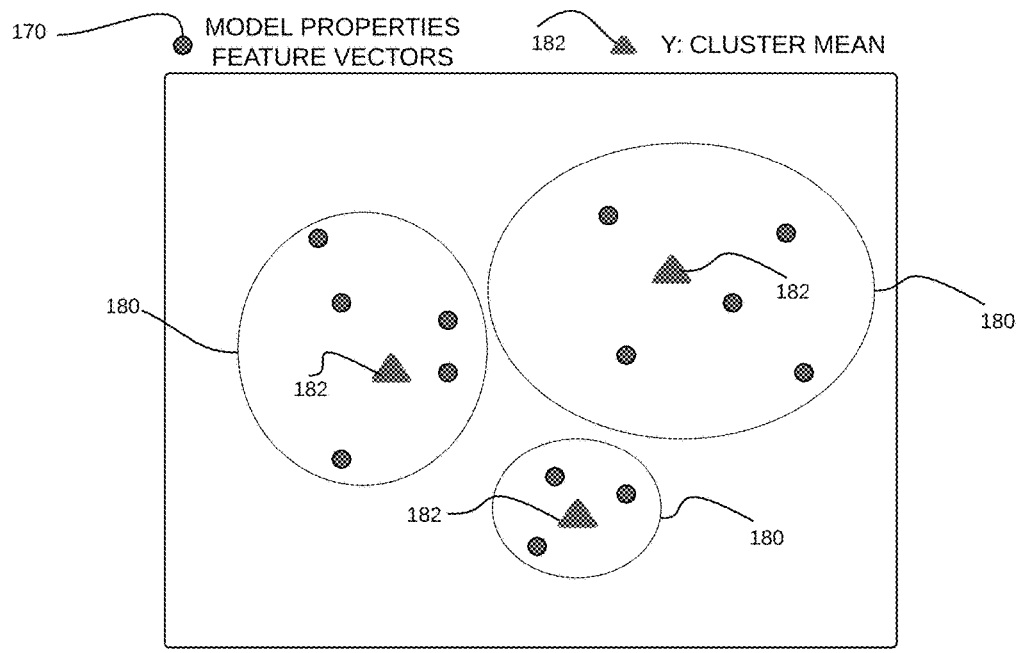
FIG. 4A depicts the process of constructing clusters of a selected set of model properties and associating a mean vector with each cluster.
FIG. 4B depicts the categorization label associated label with each of the cluster mean vectors.

Illustrated in FIG. 4A and FIG. 4B is the organization of a selected set of model properties to facilitate a transfer classification of new properties by computational methods relying on the clustering of model properties. In the illustrated embodiment, the mortgagee bank creates a plurality of clusters 180. Associated with each of the clusters is a cluster mean 182. A set of model properties in a cluster 180 is represented by plurality of features 190. In an embodiment of the invention, features 190 comprise of the zip code or location, current market value, mortgagor's equity, and condition of the model property. Also, associated with each model property is a classification label 195 that represents the mortgagee bank's evaluation of the model property suitability for mortgage transfer. Therefore, the clustering of model properties is performed with a K-Means clustering method where the number of clusters K is equal to the number of classification labels the mortgagee bank seeks to associate with the model properties.

Detailed implementation of the K-Means clustering methods described in Likas, A., Vlassis, N., & Verbeek, J. J.

(2003). The global k-means clustering algorithm. *Pattern recognition*, 36(2), 451-461; Kanungo, T., Mount, D. M., Netanyahu, N. S., Piatko, C. D., Silverman, R., & Wu, A. Y. (2002). An efficient k-means clustering algorithm: Analysis and implementation. *Pattern Analysis and Machine Intelligence, IEEE Transactions on*, 24(7), 881-892; and Pelleg, D., & Moore, A. W. (2000, June). X-means: Extending K-means with Efficient Estimation of the Number of Clusters. In ICML (pp. 727-734), and reference cited therein are incorporated herein by reference.

Every model property in a cluster 180 is assigned the same classification label 195 indicative of its suitability for mortgage transfer. In an embodiment of the invention, the classification 195 label is a label selected from a set consisting of {Excellent, Good, Poor} and is associated by the mortgagee bank to each of the model property in a cluster 180 to measure the model property's suitability for mortgage transfer. That is, if a model property's transfer suitability is classified as Excellent, the mortgagee bank will generally be very keen on getting the mortgage transferred to a suitable transferee rather than foreclose on that property. It will understood by a skilled artisan that the mortgagee bank arrives at classification 195 label for a model property after performing a detailed actuarial analysis of the property at a significant expense to the mortgagee bank. Subsequently, the mortgagee bank uses nearest neighbor analysis or a similar classification method to classify other non-model properties based on the non-model property's similarity to one or more of the model properties. In this manner, the mortgagee bank uses the power of computational analysis to perform property classification and in making a decision to proceed with a mortgage transfer. In an embodiment of the invention the computational model used for performing this analysis is based on representing all properties, including the model properties, as vectors in a feature space. Each property is a represented as a vector of feature values $\{X_1, X_2, X_3 \ldots X_m\}$ on an m-dimensional feature space where each of the values $X_i$ is the value for a feature i.

It will be appreciated by a skilled artisan that set of features 190 used to represent properties can be as extensive and as detailed as one chooses to implement. In an embodiment of the invention properties, including model properties, are represented using a 4-dimensional vectors (i.e. m=4), comprises of two numerical features namely equity and market value, and two linguistic features namely zip code and condition. Initially all the model properties are clustered to help create a sample population based on the values of their feature vectors. The task of clustering model properties 170 is accomplished using K-Means clustering procedure, hierarchical clustering, or another clustering method known to a skilled artisan is utilized. In an embodiment of the invention where K-Means clustering procedure is utilized, the number of clusters is set equal to the number of classifications 195 labels sought. In an embodiment where the classification 195 labels for each cluster is selected from a set with three (3) labels consisting of {Excellent, Good, Poor} the parameter K will be set equal to 3.

In an embodiment of the invention, a fuzzy clustering algorithm is utilized wherein every model property belongs a cluster with a degree of membership ranging from 0 . . . 1. The fuzzy clustering method allows for more variability and robustly handles model properties that lie on the boundary of multiple clusters.

In all cases however, since the process of clustering keeps similar properties in a single cluster, the clustering process relies on the computation of a metric, such as a distance metric, that measures a degree of similarity or difference between the feature vectors of model properties 170. Clusters 180 of model properties 170 are thus formed using the similarity of their corresponding feature vectors. The cluster centers are represented by a mean feature vector $\{Y_1, Y_2, Y_3 \ldots Y_m\}$ which has a set of values for each feature that represent the aggregate property for each cluster thus capturing the essence of feature values for the properties in that cluster.

Special consideration must be afforded to linguistic variable during the process of computing the values of the metric measuring the similarity of feature vectors. By the way of definition, linguistic attributes are non-numerical attributes where the distance between attribute values cannot be computed numerically. As an example the similarity between two zip codes cannot be determined by simply taking a difference of the two zip code values—rather by taking into consideration the geographical coordinates. In general, the distance between linguistic values is computed on a case-by-case basis using a special function designated to handle two values of that specific linguistic variable. In an embodiment of the invention matching linguistic attributes have a distance of 0 while non-matching linguistic attributes have a distance of 1. FIG. 5(A) depicts a systematic formulation of distance between individual values of a linguistic attribute; FIG. 5(B) depicts an example of the distance between the linguistic variable of Property Condition C.

In an embodiment of the invention, linguistic attribute comparison is performed using a tabular matrix depicted in FIG. 5A. The distance matrix shown $f_{ij}$ depicts the distance between linguistic attribute values $L_i$ and $L_j$ is denoted as $\Delta_{ij}$. FIG. 5B is an illustration of an instance of distance matrix for Property Condition—the attribute C. In this example, the attribute Move-In Ready and Excellent are close to each other with the distance of 0.1 while the attribute values Move-In Ready and Fair are farther apart with the distance of 0.6. Such a tabular representation is used to define a metric measuring the similarity between properties represented using their feature vectors.

Figures 6A, 6B:
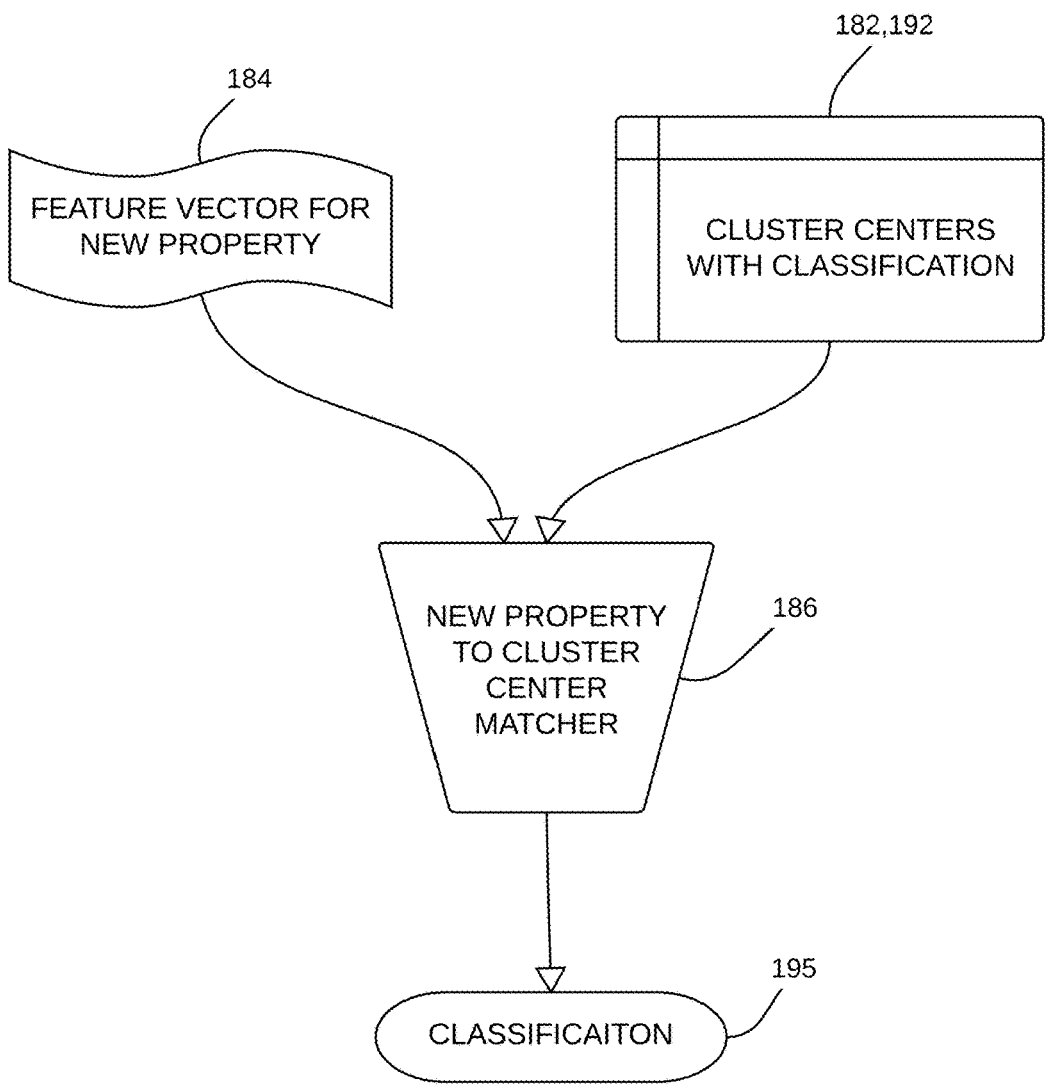
FIG. 6A depicts feature vectors.
FIG. 6B illustrates the process of classifying a property using a nearest neighborhood analysis by comparing the feature vector of a newly distressed property with the known classification associated with the pre-classified clusters.

As illustrated in FIG. 6A an embodiment of the invention uses the set of features $X_i$ 190 utilized for the representing properties for classification is the same as the set of features $Y_i$ for representing the mean clusters 182. Given the set of model clusters 182, the mortgagee bank utilizes their mean feature vectors Y for a classification of a unclassified property in order to determine the it's suitability for participation in the mortgage transfer program. As illustrated in FIG. 6B, the unclassified property vector X receives the label its nearest neighbors form amongst the set mean cluster vectors Y. This nearest neighbor computation is performed by the property to cluster center-matching module 186. The mortgagee bank to offer the mortgagor an option for participating in the mortgage transfer program uses the classification of the new property 195.

In an embodiment of the invention, the system utilizes one or more of a plurality of distance measures including Euclidean (Eq. (4)), Manhattan (Eq. (5)), and Minkowski (Eq. (6)) to search for properties X that closely match a mean cluster 182 vector Y to find the nearest neighbor for a newly distressed property.

$$\text{Euclidean: } \sqrt{\sum_{i=1}^{m}(X_i - Y_i)^2} \quad (4)$$

-continued $$\text{Manhattan:} \sum_{i=1}^{m} (|X_i - Y_i|) \quad (5)$$

$$\text{Minkowski:} \left( \sum_{i=1}^{m} (|X_i - Y_i|)^q \right)^{\frac{1}{q}} \quad (6)$$

It is understood by a person having ordinary skills in the art that the process of clustering results in the mortgagee bank generating a series of clusters, where each cluster is designated by vectors Y with features: $\{Y_1, Y_2, Y_3 \ldots Y_m\}$. The mortgagee bank treats each of these cluster vectors as representing an "average" candidate for a group of properties. Associated with each of these cluster vectors are the mortgagee banks criteria for mortgage transfer on the secondary market. Further, by the way of example, a label associated with the mean cluster vector is "no transfer"—implying that the bank's financial interest may not be well served by allowing a mortgage transfer for that property on the secondary market leaving other options such as foreclosure on the table.

FIG. 6(A) illustrates the common set of feature vectors 184 utilized for the representation of homes. In this illustration, each of the distressed property is designated by vector X with features 190: $\{X_1, X_2, X_3 \ldots X_m\}$. Each of the features $X_i$ represents variables such as Market Value of Property, Equity, Zip Code or Location of the Property, Type of Property—Commercial or Residential, Condition of the Property—{Move-In Ready, Good, Fair, Poor, Needs Extensive Repairs}, Square Footage, Property Area, Year Built, etc.

In an embodiment of the invention the distance between attribute values and $Y_i$ is computed by taking an absolute difference between the two values as in Manhattan (Eq. 5) and Minkowski (Eq. 6) distances, or by squaring the difference values as in Euclidean (Eq. 4) distance. The difference is values between linguistic variables such as the location of the property, or the type of the property, or the condition of the property, do not accurately measure the disparity between attribute values. A difference function $f_i(X_i, Y_i)$ is used to define the distance between the linguistic variables. For example, the difference between Fair condition and Good condition is smaller than the difference between Excellent and Poor condition. Therefore a function $f_i(X_i, Y_i)$ is defined for each of the attributes i, and such a function is defined for each linguistic attribute type. In an embodiment of the invention, a plurality of modified distance measures are utilized for computing distance between a candidate property X and a representative vector Y.

In an embodiment of the invention the system utilizes one or more of a plurality of distance measures that utilize a Linguistic Euclidean (Eq. (7)), Linguistic Manhattan (Eq. (8)), and Linguistic Minkowski (Eq. (9)) to search for clusters that are similar to the property that the mortgagee bank is considering for suitability of mortgage transfer.

$$\text{Linguistic Euclidean:} \sqrt{\sum_{i=1}^{m} f_i(X_i, Y_i)^2} \quad (7)$$

$$\text{Linguistic Manhattan:} \sum_{i=1}^{m} f_i(X_i, Y_i) \quad (8)$$

$$\text{Linguistic Minkowski:} \left( \sum_{i=1}^{m} f_i(X_i, Y_i)^q \right)^{\frac{1}{q}} \quad (9)$$

An embodiment of invention utilizes a set of weighting factor for attributes. These weighting factors are provided by the mortgagee bank and to enable the bank in giving a higher significance to a specific attribute such as a particular zip code for example. In an embodiment of the invention weighting factors for zip code will be higher where the mortgagee bank considers the transfer suitability to be largely governed by the zip code where the property is located. Such decisions could be a result of economic factors such as relocation of a factory that is likely to impact a large number of homes in a specific geographical area. Effectively therefore, a weight factor $w_i$ is associated with the linguistic distance $f_i(X_i, Y_i)$ between attributes $X_i$ and $Y_i$.

Correspondingly, an embodiment of the invention utilizes a one or more of a plurality of weighted linguistic distance measures including a Weighted Linguistic Euclidean (Eq. (10)), Weighted Linguistic Manhattan (Eq. (11)), and Weighted Linguistic Minkowski (Eq. (12)) to search for.

$$\text{Weighted Linguistic Euclidean:} \sqrt{\sum_{i=1}^{k} w_i f_i(X_i, Y_i)^2} \quad (10)$$

$$\text{Weighted Linguistic Manhattan:} \sum_{i=1}^{k} w_i f_i(X_i, Y_i) \quad (11)$$

$$\text{Weighted Linguistic Minkowski:} \left( \sum_{i=1}^{k} (w_i f_i(X_i, Y_i))^q \right)^{\frac{1}{q}} \quad (12)$$

A system for calculating a classification of a property data wherein the property data is represented as a plurality values for a predefined set of features where each feature describes an aspect of the property, the system comprising an input device adapted to receive the property data wherein the input device includes a first communication link adapted to transmit the property data to a computing server; an output device adapted to display or print a classification value for the property data wherein the output device includes a second communication link adapted to receive the classification value from the computing server; the computing server comprising of a processor, a database, a memory, an input module, and an output module wherein the input module is adapted to receive the property data from the input device over the first communication link and save it to a first memory location, the database having a plurality of model property data where each of the plurality of model property data includes a plurality of values for the predefined set of features, and a classification value, the processor to perform the program steps for computing the classification label by estimating and storing in a second memory location a plurality of metric values for each of the plurality of model property data where the metric value measures a similarity between the property data and the model property data, comparing data in the second memory location and storing into a third memory location those model property data values that satisfy a predefined condition, computing an aggregate classification value from the plurality of model property classification values stored in the third memory location, assigning the aggregate classification value as the classification value for the property, and communicating the classification value to the output module; the output module is adapted to transmit the classification value output device; and the output device adapted to display or print the classification value for the property data.

The classification of a property based on the classification of its nearest neighbors is the general principle of Nearest Neighbor classification techniques. Nearest Neighbor procedures described in Muja, M., & Lowe, D. G. (2014). Scalable nearest neighbor algorithms for high dimensional data. *Pattern Analysis and Machine Intelligence, IEEE Transactions* on, 36(11), 2227-2240, and reference cited therein are incorporated herein by reference.

A system for calculating a classification of a property data has an embodiment where the feature values of the plurality of model properties are clustered into groups. A system for calculating a classification of a property data has an embodiment where the program steps for computing the classification label on the property data comprises the steps of calculating a mean cluster feature vector for the plurality of model properties that belong to a cluster; calculating a distance metric between the real property feature vector and mean cluster feature vector for each of the plurality of clusters; searching for a smallest value of the distance metric and storing the classification label of the cluster with the smallest value in a storage location; assigning the classification label from the storage location to the real property; and communicating the classification value to the output module.

A system for calculating a classification of a property data has an embodiment where the distance metric is selected from a group consisting of (Euclidean, Manhattan, and Minkowski) as defined in the equations below where the property data is represented by an m-dimensional vector X and the cluster mean is represented by an m-dimensional vector Y.

A system for calculating a classification of a property data has an embodiment where the metric is selected from a group consisting of (Weighted Euclidean, Weighted Manhattan and Weighted Minkowski).

A system for calculating a classification of a property data has an embodiment where the aggregate classification value is selected as a single optimal value. A system for calculating a classification of a property data of has an embodiment where the aggregate classification value is selected as a majority classification value of the classification values stored in the third memory location.

A system for calculating a classification of a property data has an embodiment where the classification values associated with each of the plurality of model properties is selected from a group consisting of Excellent, Good, and Poor.

Figure 7:
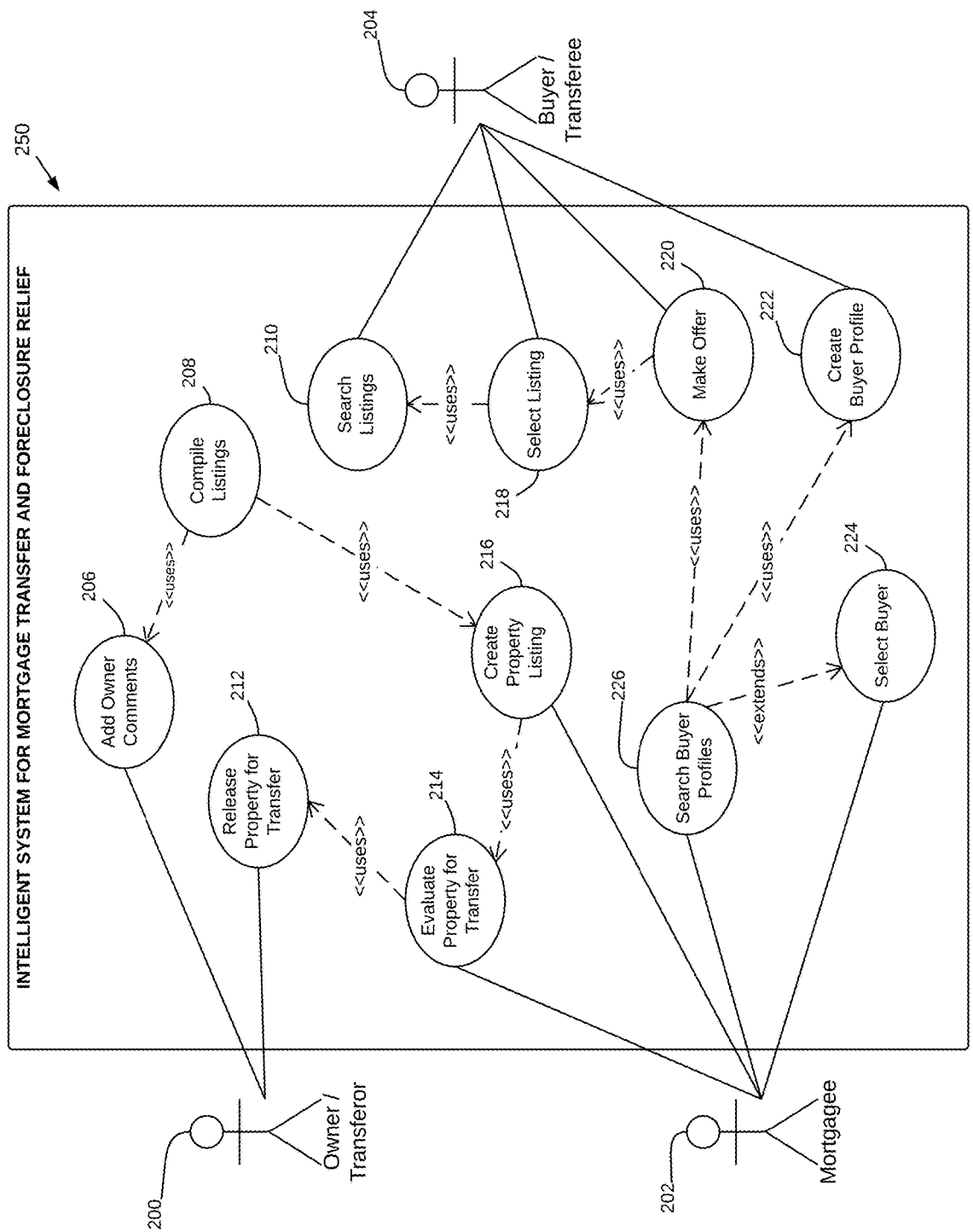
FIG. 7 is a use case diagram showing the interactions of the actors Owner/Transferor, Mortgagee Bank, and Purchaser/Transferee with the Intelligence System for Mortgage Transfer and Foreclosure Relief.

FIG. 7 depicts a use case diagram depicting the interactions of the various actors, including the Owner Transferor 200, Mortgagee Bank 202, and the Buyer Transferee 204 who has an interest in acquiring a transferred mortgage. These actors interact with an Intelligent System for Mortgage Transfer and Foreclosure Relief 250. The System 250 provides a platform for various stakeholders to interact, and also provides intelligent processing features based on software that performs clustering of properties, and matching new properties to clusters, and matching Buyer Transferees 204 to properties.

In an embodiment of the Intelligent System for Mortgage Transfer and Foreclosure Relief 250 illustrated in FIG. 7, the Owner Transferor releases their property for transfer 212 which evaluated for its transfer suitability 214 by the Mortgagee Bank 202. The System 250 uses clustering and nearest neighbor analysis for helping the Mortgagee 202 in establishing the transfer suitability 214. If the property is determined to be suitable for transfer, the Mortgagee 202 creates a property listing 216 that is further complied 208 by allowing Owner Transferor 202 to add comments 206. The Owner Transferors' 200 comments could include information that the Owner Transferor 200 feels are particularly significant for the purposes of mortgage transfer—such as the reasons why the Owner Transferor 200 is making the Property available for transfer including life events such as loss of a job, family emergency, relocation, and the like. System 250 enables the Buyer Transferee 204 to create a profile 222 that includes their personal information such as income, credit lines, and other pertinent data for establishing their ability to take on new mortgage obligations under the property transfer. System 250 allows the Buyer Transferee 204 to perform a search of the listings 210 using his or her preferences in terms of the type of property they are looking for, the level of down-payment they are able to come up with, the amount of equity in the house they are looking for, comments that the Owner has placed on the Property 206. Upon selecting a property 218, the Buyer Transferee makes an offer 220. The Mortgagee Bank 202 uses the System 250's search and matching capability to select a buyer 224 by searching their profile 226 and matching it to the offer 220. The System 250 performs this matching intelligently by taking into account the Profile of the Buyers, the Equity Payments that might be due to the Owner, the trends of mortgage transfer, and uses the Filter Listing Method to retrieve the resulting set to present to the Mortgagee Bank 202 with a ranking of the buyers based on a predefined global optimization criteria.

Figure 8:
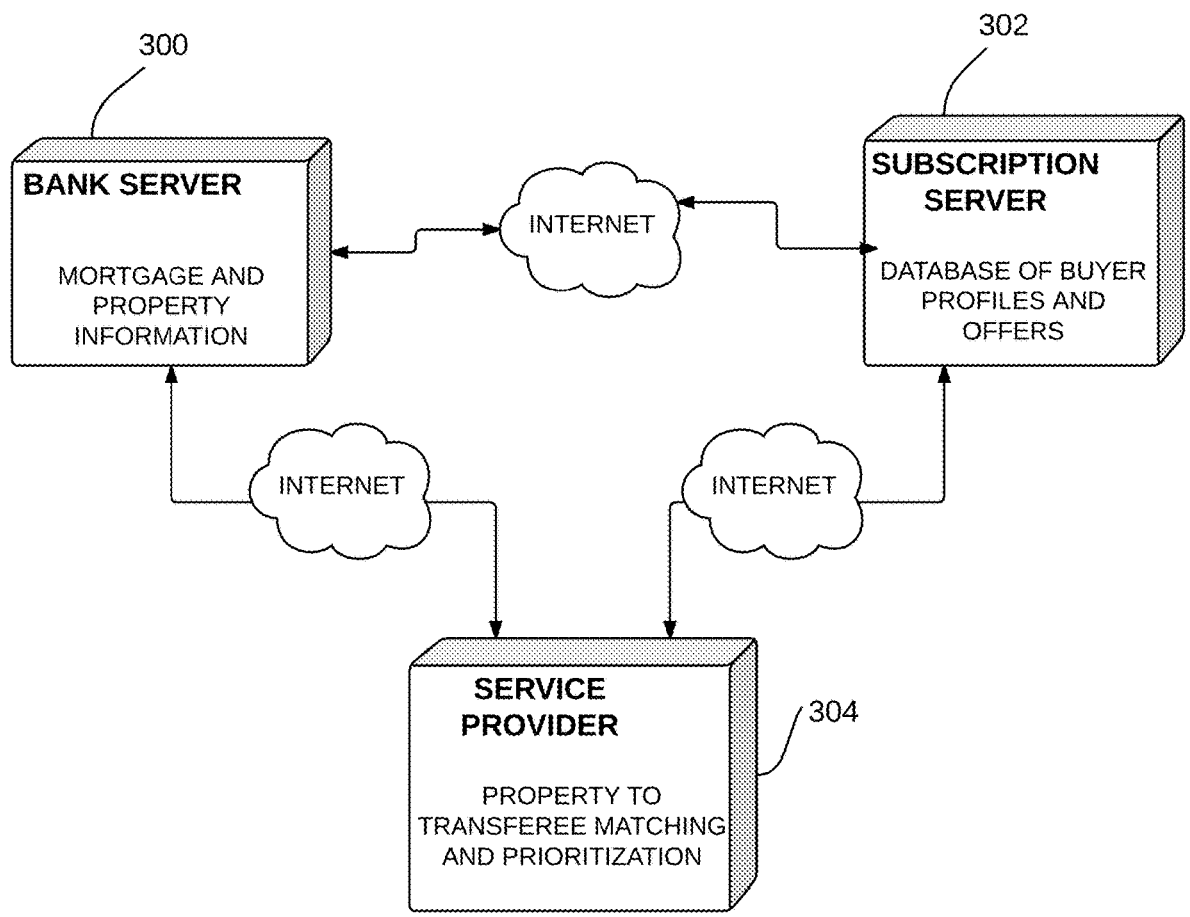
FIG. 8 depicts the interaction between the servers at the bank providing information about the properties, the service providers where the properties are listed, and the purchasers searching for properties as well as making bids on behalf of the purchaser transferee.

FIG. 8 depicts the high level components of a networked computer system used for implementing an embodiment of the mortgage transfer process. The bank utilizes its Bank Server 300 to perform an actuarial analysis of the distressed properties it holds a mortgage on. Upon selecting and compiling a list of its properties, the Bank Server communicates this list to the Service Provider Server 304. The Service Provider Server 304 therefore has a list of properties compiled and released by a plurality of Bank Servers 300. A separate Subscription Server 302 manages the accounts for a plurality of subscriber—the potential Buyers Transferees 204. The Subscription Server 302 manages their Buyers Transferees 204 profiles, sets alerts based on their interests and saves their prior searches and other-wise performs a intelligent searching of the properties available by pulling down information from the Service Provider Server 304. The Subscription Server 302 captures information on Buyer Transferee 204's preferences on the types of properties, their credit rating, the level of down payment they are willing to make, and other information related to the amount they are willing to pay. The Subscription Server 302 enables the Buyer Transferee 204 in selecting a property and making a bid that is then communicated to the Bank Server 300. The Bank Server 300 compiles a list of all bids received for a given property and negotiates the terms of transfer with the Buyer Transferee 204 through the Subscription Server 302.

At the conclusion of the bidding process, the mortgage is transferred to and assumed by a new Buyer Transferee 204. The Buyer Transferee 204 is responsible for bringing the delinquent account into a current status, and making all future payments directly to the mortgagee bank 202. The mortgagee bank 202 is therefore made whole. Due to the new ownership of the property, the original mortgagor 200 must vacate the premises. However, the original mortgagor 202 did want this option—they wanted to avoid the stress associated with a foreclosure and come out with their credit history unscathed. They are therefore in the same shoes as if they had sold their home. Therefore they are well positioned to qualify for a rental unit, or even consider owning a home within their means. This effectively adds to the gross domestic product.

Illustrated in FIG. 9 is the computation of a Transfer Support Parameter 400 (Θ) utilized by a mortgagee bank to evaluate the leverage that a mortgage transfer offers a mortgagee bank as opposed to negative consequences of a foreclosure. In an embodiment of the invention the mortgagee bank calculates the Transfer Support Parameter (Θ) by taking into consideration the value of the difference 402 between the Offer (O) and the market value (V) of the property as a fraction of the market value, the difference 406 between the amount the new purchaser/transferee is able to make as down-payment (D) and the current owner/transferor's equity (E) in the property. The linear combination of these values is multiplied by a transferability-factor 410 (τ) and a credit score factor 412 (κ). Both the factors τ and |C range between [0 . . . 1]. Transferability-factor (τ) measures the suitability of the property for a mortgage transfer with a number closer to 1 indicating a high degree of suitability. The credit score factor (κ) measures the suitability of the new purchaser in being a responsible borrower. A value of 1 for credit score factor (κ) indicates that the bank has a high degree of confidence in the borrower transferee. The parameters 404 (α) and 408 (β) indicate the level of importance the mortgagee bank wants to associate with each of the two terms relating the price and the down payment being offered by the new mortgage transferee. Using these values, the mortgagee bank calculates a Transfer Support Parameter 400 (Θ) as defined in Eq. (13) below:

$$\Theta = \left( \alpha \frac{(O-V)}{V} + \beta \frac{(D-E)}{E} \right) \times \tau \times \kappa \tag{13}$$

In an embodiment of the invention, when a property owner's appreciation in real estate is increasing the mortgage holders can be informed by either the bank or servicing company that they have positive equity in there property which could be used as a incentive for mortgages that are delinquent in payments or facing foreclosure. With the ability to have access to their equity in property but otherwise not being able to continue making mortgage payments thus becomes a motivating factor for mortgage holders to participate in the mortgage transfer.

It also makes it desirable for them to have their mortgage obligations transferred and assumed especially when they can negotiate to receive some percentage of their equity in return. Such an arrangement is beneficial to the mortgage holders as they receive a percentage back in return, beneficial to the party assuming the mortgage as they contract to benefit from the equity and do not have to put down as much capital as down payment, and beneficial to the bank since they have cash flow coming in from the continued payments.

A computer implemented method for generating a mortgage transfer offer document comprising the steps of selecting with a processor a mortgaged property record from a database containing a plurality of information on mortgaged records; estimating using a processor a mortgage transfer risk for the selected mortgaged property record; storing the mortgage property record and the mortgage transfer risk in a first memory location; selecting using a processor a purchaser record from a database containing a plurality of purchaser records; estimating using a processor a mortgage default risk for the selected purchaser record; storing the purchaser record and the mortgage default risk in a second memory location; estimating using a processor an overall mortgage transfer risk by combining the mortgage transfer risk in the first memory location and the mortgage default risk in the second memory location; producing using a processor the mortgage transfer offer document for a mortgage transfer of the selected mortgaged property to the selected purchaser when the overall mortgage transfer risk is below a predefined value; and transmitting using a communication link the mortgage transfer offer document to the selected purchaser.

A computer implemented method for generating a mortgage transfer offer document has an embodiment wherein the mortgage transfer risk of a selected mortgaged property is estimated by comparing to the mortgaged property to plurality of model properties with known mortgage transfer risk.

A computer implemented method for generating a mortgage transfer offer document has an embodiment wherein the mortgage default risk of the selected purchaser is inversely related to a credit rating of the selected purchaser.

A computer implemented method for generating a mortgage transfer offer document has an embodiment wherein the overall mortgage transfer risk is calculated as a mathematical product of the mortgage transfer risk of a selected mortgaged property and the mortgage default risk of the selected purchaser.

A computer-implemented method for generating a mortgage transfer offer document of has an embodiment where a Transfer Support Parameter is used as a basis for generating the mortgage transfer offer document.

A computer implemented method for generating a mortgage transfer offer document has an embodiment wherein the mortgage transfer offer document is communicated to the selected using an electronic communication medium.

A computer implemented method for generating a mortgage transfer offer document has an embodiment wherein the mortgage transfer offer is a provisional transfer offer that is communicated to a plurality of selected purchasers with a first purchaser to accept the offer resulting in a conversion of the provisional offer to a firm offer for the first selected purchaser recipient and canceling the offer for other recipients of the provisional offer.

In an embodiment of the invention, during the time when the real estate is depressed, real estate markets mortgage holders will benefit from having to have this burden removed through mortgage transfer and acquisition by a third party. In a situation when the amount owed on the mortgage is more than the value of the property, equity can be forced into the property by the buyer transferee by doing updates and property improvements. With property deeply in negative equity from market times or because a second mortgage or a equity loan is tied to the property the mortgagee bank might absorb some of the negative equity—cut their losses—in order to have this property back into a positive producing asset. The mortgagee bank will balance the cost of engaging in a foreclosure proceedings and the cost of absorbing part of the negative equity and may balance from absorbing losses when the assuming party has good creditworthiness and represents a low risk proposition.

The business method disclosed in this application does displace some of the industries surrounding the mortgage foreclosures. These primarily include the services companies caring for the upkeep of the properties in foreclosures, as well as legal professional taking care of filing and following the statutory provisions of a state's specific foreclosure laws. It will be noticed by a skilled artisan that under the disclosed business method, a vibrant secondary real estate market having all the income generating potential of a primary real estate market will displace these industries. Furthermore, the legal professionals engaged in foreclosure can just as easily find a vibrant industry in drafting and negotiating mortgage transfer contracts. It will be appreciated by a skilled artisan that the activities associated with the disclosed business methods are much more vibrant and capable of adding significantly more to the gross domestic product when compared to existing foreclosure based termination of property ownership by a defaulting mortgagor.

A system is disclosed for producing mortgage transfer document comprising a database containing information on a plurality of mortgaged properties wherein each of the mortgaged property has a market value and a loan value and the mortgage interest for each of the mortgaged properties is held by a mortgagee bank; a database containing information on a plurality of purchasers; a processor for calculating transfer risk; a communication link for receiving bids; a processor for estimating the overall risk; a plurality of memory locations for receiving offers from a plurality of transferee purchasers wherein the offer from each transferee purchasers specifies a purchase price and down payment; a processor for executing a steps of a transferee selection program where the transfer selection program performs the steps of retrieving each of the plurality of transfer offers from the memory locations, estimating a risk for each transfer offer, selecting a winning transferee purchaser to receive a mortgage transfer offer document where an acceptance of the mortgage transfer offer document by the winning transferee minimizes a foreclosure risk for mortgagee bank; and a communication link for conveying the mortgage transfer document to the selected purchaser.

A system for producing mortgage transfer document has an embodiment wherein the processor for executing a steps of a transferee selection program estimates the risk for each transfer offer by an average over a risk for a preselected set of properties.

A system for producing mortgage transfer document has an embodiment wherein the mortgage transfer document is generated only when the foreclosure risk for the mortgagee bank is lower than a predefined threshold.

A system for producing mortgage transfer document has an embodiment wherein the offer placed by the purchaser is more than a loan value of the mortgaged property where the loan value is equal to the amount that is owed to the mortgagee bank.

A system for producing mortgage transfer document has an embodiment wherein the down payment placed by the purchaser is more than an equity value of the mortgaged property where the equity value for a property is defined as a difference between the market value and the loan value.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the embodiments of the invention without departing from the spirit and scope of the appended claims. The foregoing description is illustrative of particular embodiments of the invention, but is not meant to be a limitation upon the practice thereof. The following claims, including all equivalents thereof, are intended to define the scope of the invention.

What is claimed is:

1. A system for producing mortgage transfer document comprising, the system:
a server arrangement for communication of a bank server, a subscription server, and a service provider server to generate a mortgage transfer document according to a vectoring link, a clustering link, and a matching link,
the vectoring link providing access to a property database, a buyer database, and a mortgage database,
the property database comprising a plurality of model property vectors, wherein each of the plurality of model property vectors has an associated external classification rating representing a transfer desirability, and transferability coefficient $\tau$,
the buyer database comprising a plurality of buyers wherein a credit score factor $\kappa$, an offer amount (O) and a payment amount (D) associated with each of the plurality of buyers, and
the mortgage database comprising a plurality of mortgaged properties wherein each of the mortgaged property has an associated value (V) and equity (E);
the clustering link providing operations including:
creating a plurality of clusters where each cluster is a group comprising one or more the model property vectors,
computing a cluster center for each of the plurality of clusters thereby creating a plurality of cluster centers, and
associating a classification rating for each of the plurality of clusters thereby creating a plurality of cluster classification ratings;
the matching link providing operations including:
retrieving from the mortgage database, each of the plurality of the mortgaged property vectors and performing a nearest neighbor analysis for each mortgaged property vector using the plurality of cluster centers and the plurality cluster classification ratings as a training data set to produce a computed classification rating and a computed transferability coefficient for the mortgaged property,
retrieving from the buyer database, the offer amount (O) and the payment amount (D) associated with each of the plurality of buyers, and
computing a Transfer Support Parameter ($\Theta$) for each combination of each buyer and each mortgaged property vector using a mathematical equation:

$$\Theta = \left(\alpha \frac{(O-V)}{V} + \beta \frac{(D-E)}{E}\right) \times \tau \times \kappa;$$

and
associating the buyer and the mortgaged property vector in response to the Transfer Support Parameter ($\Theta$) combination for the respective combination of the buyer and the mortgaged property vector exceeding a predetermined threshold;
matching a set of similar clusters to a new property vector; and
generating a mean feature vector based on an aggregate property for each cluster of the matched set of similar clusters.

2. A computer implemented process for mortgaged property assignment, the process comprising:

generating, by a server arrangement for communication of a bank server, a subscription server, and a service provider server, a mortgage transfer document generated according to a vectoring link, a clustering link, and a matching link, wherein the vectoring link provides access to a plurality of model property vectors, and the clustering link provides access to an external classification rating for each of the plurality of model property vectors, wherein the external classification rating represents a transfer desirability;

creating, by the server arrangement, a plurality of clusters where each cluster is a group comprising one or more the model property vectors;

computing, by the server arrangement, a cluster center for each of the plurality of clusters thereby creating a plurality of cluster centers, and a classification rating designated to each of the plurality of clusters;

receiving, by the server arrangement, a new property vector;

performing, by the server arrangement, a nearest neighbor analysis for the new property vector using the plurality of cluster centers and the associated cluster classification ratings, as a training data set, wherein the nearest neighbor analysis is configured to identify a set of similar clusters, wherein each of the similar clusters has a predetermined similarity to the new property vector;

performing, by the server arrangement, an aggregation of the classification ratings of the set of similar clusters to produce a computed classification rating; and communicating, by the server arrangement, the computed classification rating of the new property vector to a requester;

matching the set of similar clusters to the new property vector; and generating a mean feature vector based on an aggregate property for each cluster of the matched set of similar clusters.

3. The process of claim 2, wherein the external classification labels ratings are selected from a group consisting of Poor, Average, Good, and Excellent, and wherein the rating Poor has a sort value of 1, the rating Average has a sort value of 2, the rating Good has a sort value of 3, and the rating Excellent has a sort value of 4.

4. The process of claim 2, further comprising:

providing a subscriber database comprising a plurality of buyers and including a credit score factor κ with each of the plurality of buyers, wherein the credit score factor κ is-adapted to measure a confidence in the buyer; and generating a transferability coefficient τ adapted to measure a transfersuitability of the new property vector.

5. The process of claim 4, further comprising:

providing a value (V) and an equity (E) associated with the new property vector;

receiving, by the server arrangement, an offer having an offer amount (O) and a payment amount (D) associated with the new property vector; and generating a Transfer Support Parameter (Θ) using a mathematical equation:

$$\Theta = \left(\alpha \frac{(O-V)}{V} + \beta \frac{(D-E)}{E}\right) \times \tau \times \kappa,$$

wherein a parameter (α) and parameter (β) indicating a level of significance is associated with the Offer (O) and the down payment (D); and communicating the Transfer Support Parameter (Θ) to the requestor.

6. The process of claim 5, further comprising:

accessing a plurality of buyers with each buyer having an associated offer amount (O) and a payment amount (D);

receiving, by the server arrangement, a threshold value of Threshold Support Parameter (Θ); and communicating to the requester a list of buyers that meet the threshold value of Threshold Support Parameter (Θ).

7. The process of claim 6, further comprising:

providing a transferability coefficient associated with each of the plurality of model property vectors;

computing, by the server arrangement, a cluster transferability coefficient for each of the plurality of clusters; and performing, by the server arrangement, an aggregation of the transferability coefficient of the set of similar k clusters to produce a computed transferability coefficient τ for the new property.

8. The process of claim 6, further comprising:

receiving the credit score factor IC of each of the plurality of buyers from a credit reporting service.

9. The process of claim 6, further comprising:

providing a transferability coefficient associated with each of the plurality of model property vectors;

generating a transferability coefficient τ for the new property vector as an aggregate of the transferability coefficient of the set of similar k clusters; and receiving the credit score factor κ of each of the plurality of buyers from a credit reporting service.

10. The process of claim 2, wherein the nearest neighbor analysis uses a metric value for measuring the similarity chosen from the metrics defined in following equations, and wherein the new property vector is represented by an m-dimensional vector X=(X1, X2, . . . Xm), and the model property vector is represented by an m-dimensional vector Y=(Y1, Y2, . . . Ym):

$$\text{Euclidean: } \sqrt{\sum_{i=1}^{m}(X_i - Y_i)^2}$$

$$\text{Manhattan: } \sum_{i=1}^{m}(|X_i - Y_i|)$$

$$\text{Minkowski: } \left(\sum_{i=1}^{m}(|X_i - Y_i|)^q\right)^{\frac{1}{q}}$$

11. The process of claim 2, wherein the nearest neighbor analysis uses a metric value for measuring the similarity chosen from the metrics defined in following equations, and wherein the new property vector is represented by an m-dimensional vector X=(X1, X2, . . . Xm), and, the model property vector is represented by an m-dimensional vector Y=(Y1, Y2, . . . Ym), and a weight factor Wi is associated with a linguistic or quantitative distance $f(X; YJ$ between attributes X and Yr $$\text{Weighted Linguistic Euclidean: } \sqrt{\sum_{i=1}^{m} w_i f(X_i, Y_i)^2}$$

$$\text{Weighted Linguistic Manhattan: } \sum_{i=1}^{m} w_i f(X_i, Y_i)$$

$$\text{Weighted Linguistic Minkowski: } \left[\sum_{i=1}^{m} w_i f(X_i, Y_i)^q\right]^{\frac{1}{q}}$$

12. The process of claim 2, further comprising:
calculating a distance metric between the new property vector and the cluster center for each of the plurality of clusters;
searching for a smallest value of the distance metric and storing the classification rating of the cluster with the smallest value in a storage location; and
communicating the classification rating from the storage location to the requester.

13. The process of claim 2, the server arrangement further providing operations to:
cluster the model property database vectors a k-Means clustering program, wherein a parameter 'k' used by the k-Means clustering program is equal to a quantity of classification labels.

14. The process of claim 2, wherein each cluster contains exactly one model property vector, wherein an addition of a model property vector results in a creation of a new cluster having the added model property as its single member.

15. A system comprising:
a server arrangement for communication of a bank server, a subscription server, and a service provider server to generate a mortgage transfer document according to a vectoring link, a clustering link, and a matching link;
the vectoring link having access to a plurality of model property vectors, wherein each of the plurality of model property vectors has an associated external classification rating representing a transfer desirability, and the vectoring link is configured to receive a new property vector;
the clustering link providing operations including:
creating, by the server, a plurality of clusters, wherein each cluster is a group comprising one or more the model property vectors,
computing a cluster center assigned to each of the plurality of clusters thereby creating a plurality of cluster centers, and further designating a classification rating for each of the plurality of clusters,
performing a nearest neighbor analysis for the new property vector using the plurality of cluster centers and the plurality cluster classification ratings as a training data set, wherein the nearest neighbor analysis is configured to identify a set of similar clusters, and wherein each of the similar clusters has a predetermined similarity to the new property vector, and
performing an aggregate of the classification rating of the set of the similar clusters to produce a computed classification rating;
the matching link providing operations including:
matching the set of similar clusters to the new property vector;
generating a mean feature vector based on an aggregate property for each cluster of the matched set of similar clusters, and
communicating the computed classification label to a requestor.

16. The system of claim 15, the server arrangement further providing operations to:
associate for the new property a fuzzy degree of membership to each of the similar clusters, wherein the fuzzy degree of membership is used as a weighting factor in computing the classification rating of the new property.

17. The system of claim 15, wherein the nearest neighbor analysis uses a metric value for measuring similarity chosen from the metrics defined in following equations, and
wherein the new property vector represented by an m-dimensional vector X=(X1, X2, . . . Xm), and, the model property vector is represented by an m-dimensional vector Y=(Y1, Y2, . . . Ym), and a weight factor Wi is associated with the linguistic or quantitative distance ƒ(X; YJ between attributes X and Yr $$\text{Weighted Linguistic Euclidean: } \sqrt{\sum_{i=1}^{m} w_i f(X_i, Y_i)^2}$$

$$\text{Weighted Linguistic Manhattan: } \sum_{i=1}^{m} w_i f(X_i, Y_i)$$

$$\text{Weighted Linguistic Minkowski: } \left[\sum_{i=1}^{m} w_i f(X_i, Y_i)^q\right]^{\frac{1}{q}}$$

18. The system of claim 15, the server arrangement further providing operations to:
cluster the plurality of model property vectors by executing a k-Means clustering program, wherein a parameter 'k' used by the k-Means clustering program is equal to a quantity of classification labels.

19. The system of claim 15, wherein the server arrangement further providing operations to:
access to a subscriber database comprising a plurality of buyers and includes a credit score factor JC with each of the plurality of buyers, wherein the credit score factor JC is adapted to measure a confidence in the buyer,
associate a transferability coefficient τ with each of the plurality of model property vectors, and
generate a transferability coefficient τ for the new property vector as an aggregate of the transferability coefficient τ of the k similar clusters.

20. The system of claim 19, the server arrangement further providing operations to:
associate a value (V) and an equity (E) with the new property vector;
associate an offer having an associated offer amount (O) and a payment amount (D) for the new property vector;
execute the following mathematical equation to produce a computed Transfer Support Parameter (Θ):

$$\Theta = \left(\alpha \frac{(O-V)}{V} + \beta \frac{(D-E)}{E}\right) \times \tau \times \kappa$$

associate a parameter (α) and parameter (β) indicating a level of significance with the Offer (O) and the down payment (D); and
communicate the computed Transfer Support Parameter (Θ) to the requestor.

* * * * *